Dec. 18, 1923. 1,477,844
K. E. R. NYSTRÖM
APPARATUS FOR BAKING, ROASTING, COOKING, AND THE LIKE
Filed April 3, 1922
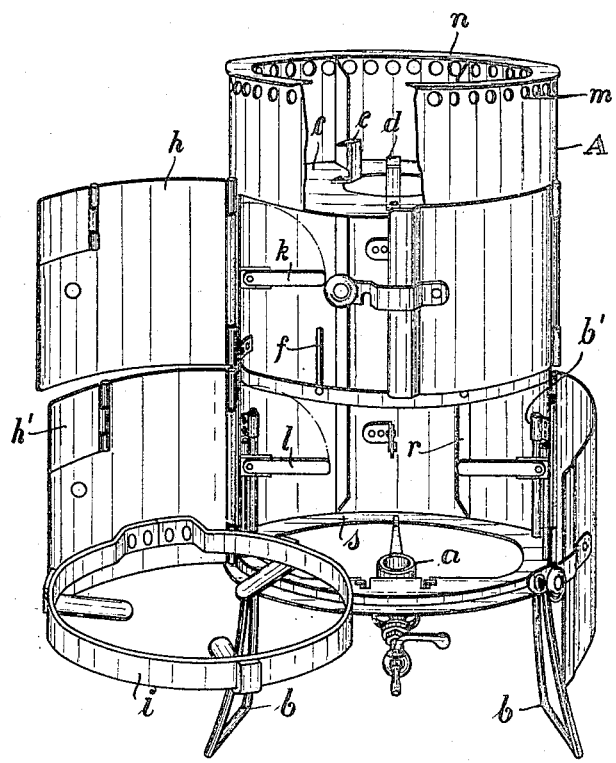
Inventor
Knut E. R. Nyström
atty.

Patented Dec. 18, 1923.

1,477,844

UNITED STATES PATENT OFFICE.

KNUT ERNST REINHOLD NYSTRÖM, OF STOCKHOLM, SWEDEN, ASSIGNOR TO AKTIEBOLAGET OPTIMUS, OF UPLANDS-VASBY, SWEDEN, A CORPORATION OF SWEDEN.

APPARATUS FOR BAKING, ROASTING, COOKING, AND THE LIKE.

Application filed April 3, 1922. Serial No. 549,083.

*To all whom it may concern:*

Be it known that I, KNUT ERNST REINHOLD NYSTRÖM, a citizen of the Kingdom of Sweden, residing at Stockholm, Sweden, have invented new and useful Improvements in Apparatus for Baking, Roasting, Cooking, and the like, of which the following is a specification.

This invention relates to an apparatus which is adapted to be used on grates or in connection with petroleum stoves, spirit burners, gas burners and the like and by means of which a plurality of culinary operations—cooking, baking, roasting and so on—may be carried out simultaneously on a single flame in a very short time.

Cooking apparatus for gas, spirit or petroleum are already well-known, in which a single flame serves for heating a number of cooking vessels disposed one above the other, but such apparatus are not suitable for simultaneous roasting, baking and cooking as they do not have regard for the fact that roasting, baking and cooking operations require different lengths of time and also essentially different temperatures. Baking and roasting require a higher temperature than cooking and the former operations must, therefore, be carried out in the part of the apparatus nearest to the flame where the temperature is very high, while the cooking operation should be effected in the upper part of the apparatus. Baking and roasting operations, moreover, are generally terminated in a shorter time than cooking of foodstuffs. Care must, therefore, be taken that the heat generated by the burner, in spite of the baking or roasting operations which are carried out in the lower part of the apparatus, can rise sufficiently rapidly and freely so that the heating gases also can heat cooking vessels to the boiling point in the uppermost part of the apparatus. The cooking operation should not be essentially disturbed by the removal or shifting of the baking or roasting pans in the lower part of the apparatus. Furthermore, it must be observed that the steam which is evolved in cooking considerably reduces the temperature of the heating gases, when mixed with the latter, and prevents the baking if baking and cooking should take place in the same compartment of the apparatus.

The present apparatus is constructed with the above mentioned requirements in view and the invention consists, chiefly, in the combination of a housing, an intermediate perforated bottom dividing the interior of the housing into one upper cooking compartment and one lower baking and roasting compartment, means for supporting a cooking vessel above said bottom, means for supporting other culinary vessels at different levels in the lower compartment said means allowing the heating gases from the source of heat freely to rise along the walls of the housing up to the intermediate bottom, and doors giving access to said lower compartment. On account of the absence of any intermediate bottoms in the lower part of the apparatus, it is possible to open the doors and remove or insert the baking or roasting pans without interfering essentially with the cooking operation taking place in the upper compartment of the apparatus.

In the accompanying drawing I have shown diagrammatically one embodiment of my invention.

Referring to the drawing, the apparatus consists of a preferably cylindrical housing A of sheet or cast iron, in which a plurality of culinary vessels, such as roasting pans and cooking vessels can be placed above each other. In the upper part of the housing an intermediate bottom $c$ is provided which has a central opening $d$ and supports $e$ for supporting a cooking vessel placed thereon. The part of the apparatus which lies beneath the said bottom $c$ forms a single free room without intermediate bottoms, said room being divided into compartments by means of grates, $k$, $l$, projections $f$ or the like at different levels on which roasting or baking pans can be placed. The heating gases can thus rise along the inner wall of the housing sufficiently freely for heating to the boiling-point the contents of a cooking vessel placed above the intermediate bottom $c$. The draft in the apparatus is, as the experience has shown, sufficiently great to allow the doors $h$ of the lower compartment to be opened for removing or inserting baking or roasting pans, without causing the boiling in the cooking vessel, placed above the bottom $c$, to cease.

For facilitating the insertion and removal of the vessels in the lower compartment of the apparatus one or more rings $i$ are secured to the doors $h$ or said rings may be rotatably secured directly to the housing at the side of the door opening. Such device for supporting the pans has also a great practical value inasmuch as it makes it possible to maintain the contents of the pan in full boiling when thickening sauces, creams and similar foods as the pan can be turned to and fro above the flame by the right hand while the meal is added with the left hand.

The doors $h$ may be provided with small openings $h'$ in such position that usual shafted culinary vessels may be used in the apparatus, if desired, without preventing the closing of the doors. At the bottom the apparatus is provided with a gas burner $a$ which is seated in a rotatable ring $r$ in such manner that the connection of the gas burner with an existing gas pipe in the kitchen can be easily effected. The gas burner is detachably seated in the ring $r$ so that, if desired, it can be removed for enabling the use of another source of heat, as for instance a stationary gas burner or a petroleum stove. The legs $b$ of the apparatus have the form of bows and are adjustable and removable being displaceable in corresponding guide sleeves $b'$ secured to the housing, so that the length thereof can be suited to the source of heating to be used. Preferably the legs $b$ are springy so that, without any special locking means, they will be automatically kept in the adjusted position.

In order to keep the culinary vessels placed on the bars $f$ or the projections $k, l$ centered in the housing and thus to secure a uniform rising of the heating gases along the walls of the housing vertical, guiding ribs $s$ may be provided on the inside of the housing. On account of the uniform distribution of the heating gases thus secured the heating of the baking and roasting pans inserted in the apparatus will be quite uniform. The projections or arms $k, l$ preferably are hinged to the wall of the housing so that, if desired, they can be folded upwards or sideways. The arms may have double joints so that they may be folded to a greater or smaller length at will thus suiting them for pans of different diameters. For facilitating the folding up or down of the said arms they are preferably made of angle-iron or provided with lateral projections. At the top the housing is provided with draft holes $m$ and it may be closed by a cover when the upper compartment is not used for cooking. If on the other hand a cooking vessel is placed in said compartment said vessel or its cover preferably should have such diameter that it practically tightens against the flange $n$ of the housing.

What I claim is:—

1. An apparatus for simultaneous baking, roasting, cooking and the like by means of a single source of heat placed at the base of the apparatus, comprising a vertical cylindrical housing, an intermediate centrally perforated bottom dividing the interior of the housing into one upper cooking compartment and one lower baking and roasting compartment, means for supporting a cooking vessel above said bottom, projections foldably secured to the inner wall of the housing in said lower compartment, doors giving access to said lower compartment and swingable rings adapted to support culinary pans in the lower compartment of the housing.

2. An apparatus for simultaneous baking, roasting, cooking and the like by means of a single source of heat placed at the base of the apparatus, comprising a vertical cylindrical housing, an intermediate centrally perforated bottom dividing the interior of the housing into one upper cooking compartment and one lower baking and roasting compartment, means for supporting a cooking vessel above said bottom, projections foldably secured to the interior wall of the housing at different levels in said lower compartment, doors giving access to said lower compartment, and rings secured to said doors and adapted to support culinary pans.

3. An apparatus for simultaneous baking, roasting, cooking and the like by means of a single source of heat placed at the base of the apparatus, comprising a vertical cylindrical housing, an intermediate centrally perforated bottom dividing the interior of the housing into one upper cooking compartment and one lower baking and roasting compartment, means for supporting a cooking vessel above said bottom, means for supporting other vessels at different levels in the lower compartment, and vertical guiding ribs secured to the inner wall of the housing.

4. An apparatus for simultaneous baking, roasting, cooking and the like by means of a single source of heat, comprising a vertical cylindrical housing, an intermediate, centrally perforated bottom in said housing dividing the interior of the housing in one upper and one lower compartment, means for supporting culinary pans at different levels in said lower compartment, doors giving access to said lower compartment and having openings in such position as to allow the handles of the pans to project therethrough.

In testimony whereof I have signed my name.

KNUT ERNST REINHOLD NYSTRÖM.